(12) United States Patent
Ellis-Monaghan et al.

(10) Patent No.: US 9,740,080 B2
(45) Date of Patent: Aug. 22, 2017

(54) WAVEGUIDE SWITCH WITH TUNED PHOTONIC MICRORING

(71) Applicant: International Business Machines Corporation, Armonk, NY (US)

(72) Inventors: John J. Ellis-Monaghan, Grand Isle, VT (US); Jeffrey P. Gambino, Portland, OR (US); Mark D. Jaffe, Shelbourne, VT (US); Kirk D. Peterson, Jericho, VT (US); Jed H. Rankin, Richmond, VT (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 14/927,621

(22) Filed: Oct. 30, 2015

(65) Prior Publication Data

US 2017/0123290 A1   May 4, 2017

(51) Int. Cl.
*G02F 1/295* (2006.01)
*G02F 1/313* (2006.01)
*G02F 1/01* (2006.01)
*G02F 1/025* (2006.01)

(52) U.S. Cl.
CPC .......... *G02F 1/3137* (2013.01); *G02F 1/0147* (2013.01); *G02F 1/025* (2013.01); *G02F 2202/10* (2013.01)

(58) Field of Classification Search
None
See application file for complete search history.

(56) References Cited

U.S. PATENT DOCUMENTS

| | | | |
|---|---|---|---|
| 6,411,752 B1* | 6/2002 | Little | H04B 10/2569 385/11 |
| 6,701,033 B2* | 3/2004 | Okayama | G02B 6/12002 385/16 |
| 7,110,628 B2 | 9/2006 | Wong et al. | |
| 7,376,167 B2 | 5/2008 | Yu | |
| 7,751,655 B2 | 7/2010 | Fattal et al. | |
| 8,009,943 B2 | 8/2011 | Bratkovski et al. | |
| 8,295,655 B2 | 10/2012 | Manipatruni et al. | |
| 8,971,714 B2 | 3/2015 | Vawter et al. | |
| 9,184,865 B2* | 11/2015 | Akiyama | G02F 1/0147 |

(Continued)

FOREIGN PATENT DOCUMENTS

| | | |
|---|---|---|
| CN | 103955147 A | 7/2014 |
| WO | 2014116828 A2 | 7/2014 |

OTHER PUBLICATIONS

Grillanda et al., "Wavelength Tuning, Locking and Swapping of a Silicon Photonics Microring Resonator by Transparent Light Monitor," Optical Communication (ECOC), 2014 European Conference. 2014. pp. 1-3.

(Continued)

*Primary Examiner* — Sung Pak
(74) *Attorney, Agent, or Firm* — Steven J. Meyers; Hoffman Warnick LLP

(57) ABSTRACT

Various particular embodiments include an optical structure, including: a photonic microring including an integral signal detector for detecting a level of an optical signal in the photonic microring; and a controller, coupled to the signal detector, for selectively adjusting a resonant frequency of the photonic microring based on the detected level of the optical signal in the photonic microring.

14 Claims, 7 Drawing Sheets

(56) References Cited

U.S. PATENT DOCUMENTS

| | | |
|---|---|---|
| 2004/0114867 A1 | 6/2004 | Nielsen et al. |
| 2008/0267557 A1 | 10/2008 | Wang et al. |
| 2009/0238515 A1* | 9/2009 | Fattal ................ G02B 6/12007 385/30 |
| 2016/0327818 A1* | 11/2016 | Vo .......................... G02F 1/025 |

OTHER PUBLICATIONS

Logan et al., "Monitoring and Tuning Micro-Ring Properties Using Defect-Enhanced Silicon Photodiodes at 1550 nm," Photonics Technology Letters, IEEE. 24(4):261-3 (2012).

Chen et al., "Integrated GHz silicon photonic interconnect with micrometer-scale modulators and detectors," School of Electrical and Computer Engineering, Cornell University. 2009 (9 pages).

Buckwalter et al., "A Monolithic 25-Gb/s Transceiver With Photonic Ring Modulators and Ge Detectors in a 130-nm CMOS SOI Process," IEEE Journal of Solid-State Circuits. 47(6):1309-22 (2012).

Li et al., "A Ring-Resonator-Based Silicon Photonics Transceiver with Bias-Based Wavelength Stabilization and Adaptive-Power-Sensitivity Receiver," ISSCC 2013, Session 7, Optical Transceivers and Silicon Photonics, 7.5, IEEE International Solid-State Circuits Conference. 2013, pp. 124-126.

* cited by examiner

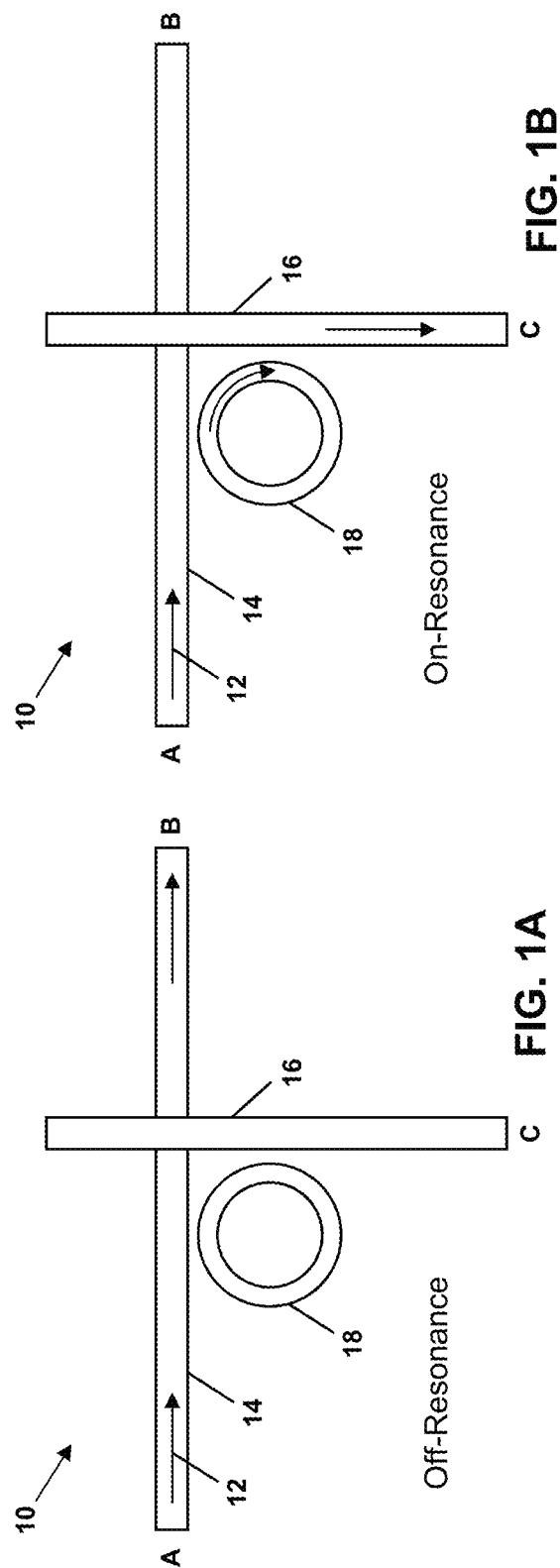

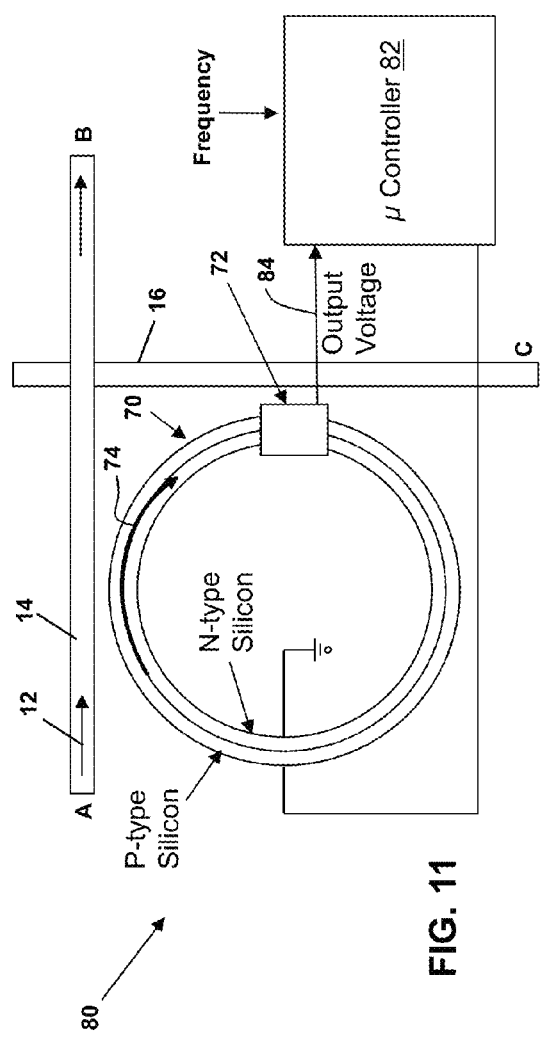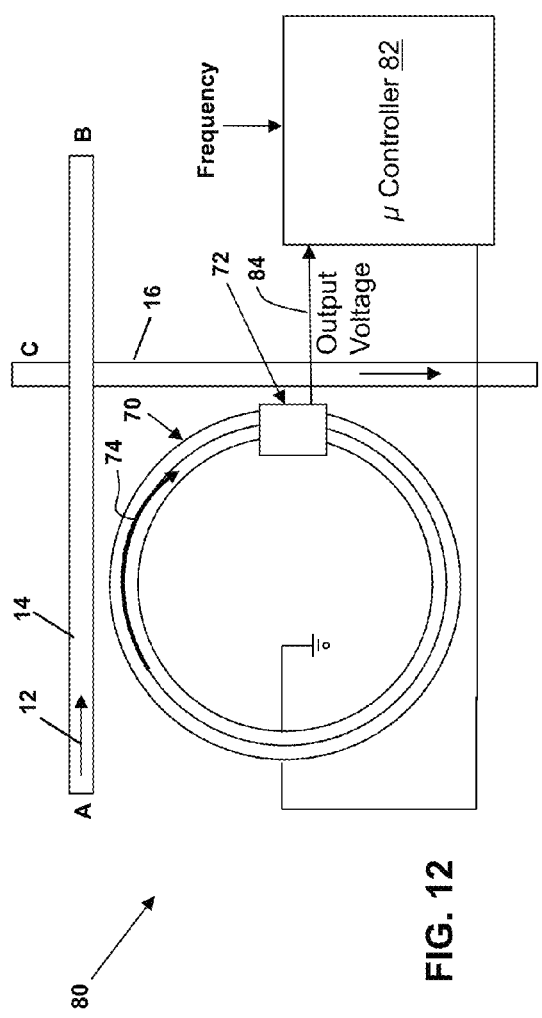

WAVEGUIDE SWITCH WITH TUNED PHOTONIC MICRORING

TECHNICAL FIELD

The subject matter disclosed herein relates to integrated circuits. More particularly, the subject matter relates to a waveguide switch with tuned photonic microring.

BACKGROUND

Photonic microrings have been used to create waveguide switches. An example of such a waveguide switch 10 is depicted in FIGS. 1A and 1B. In FIG. 1A, an optical signal 12 is shown traveling via a first waveguide 14 (e.g., a silicon waveguide) from a point A to a point B. A second waveguide 16 crosses over the first waveguide 14. A photonic microring 18 is positioned adjacent the intersection of the first and second waveguides 14, 16. In FIG. 1A, the optical signal 12 is off-resonance with the photonic microring 18. In FIG. 1B, however, the optical signal 12 is on-resonance with the photonic microring 18, such that the optical signal 12 is coupled through the photonic microring 18 into the second waveguide 16, traveling from point A to point C. A bias may be applied to the photonic microring 18 to shift the frequency of the photonic microring 18 (e.g., toward and/or away from a resonance frequency).

One type of photonic microring 18A is depicted in FIG. 2. The photonic microring 18A includes a layered structure of n-type/p-type silicon. The frequency of the photonic microring 18A may be tuned by applying a voltage bias across the pn junction formed by the layered structure of n-type/p-type silicon. As shown in FIG. 3, the frequency shift is proportional to the applied bias.

Another type of photonic microring 18B is depicted in FIG. 4. The frequency of the photonic microring 18B may be tuned by changing the temperature of the photonic microring 18B. This may be accomplished, for example, by placing one or more resistors 20 in close proximity of the photonic microring 18B and applying a voltage bias across the resistors 20. As shown in FIG. 5, the frequency shift is proportional to the applied temperature.

It is difficult to manufacture photonic microrings with exact resonance frequencies.

SUMMARY

A first aspect provides an optical structure, including: a photonic microring including an integral signal detector for detecting a level of an optical signal in the photonic microring; and a controller, coupled to the signal detector, for selectively adjusting a resonant frequency of the photonic microring based on the detected level of the optical signal in the photonic microring.

A second aspect provides an optical switch, including: a first waveguide; a second waveguide; a photonic microring including an integral signal detector for detecting a level of an optical signal in the photonic microring; and a controller, coupled to the signal detector, for adjusting a resonant frequency of the photonic microring based on the detected level of the optical signal in the photonic microring to selectively couple an optical signal from the first waveguide, through the photonic microring, into the second waveguide.

A third aspect provides a method for controlling a path of light in an optical circuit, comprising: detecting a level of an optical signal in a photonic microring, the photonic microring including an integral signal detector; and adjusting a resonant frequency of the photonic microring based on the detected level of the optical signal in the photonic microring to selectively couple an optical signal from a first waveguide, through the photonic microring, into a second waveguide.

BRIEF DESCRIPTION OF THE DRAWINGS

These and other features of this invention will be more readily understood from the following detailed description of the various aspects of the invention taken in conjunction with the accompanying drawings that depict various embodiments of the invention.

FIGS. 1A and 1B depict a waveguide switch including a photonic microring.

FIGS. 11 and 12 depict a waveguide switch including the photonic microring of FIG. 4 according to embodiments.

DETAILED DESCRIPTION

As noted, the subject matter disclosed herein relates to integrated circuits. More particularly, the subject matter relates to a waveguide switch with tuned photonic microring.

Figure 3:
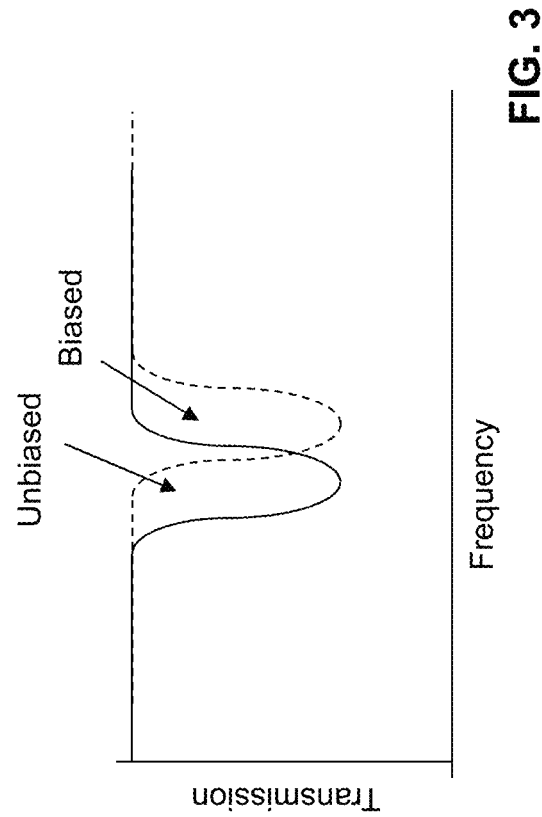
FIG. 3 depicts the operation of the photonic microring of FIG. 2.
Figure 2:
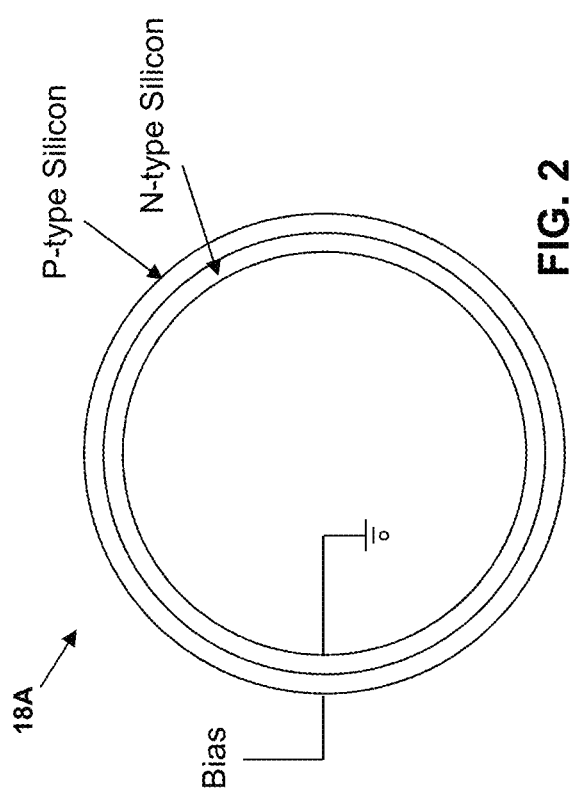
FIG. 2 depicts a photonic microring with a tunable resonance frequency.
Figure 5:
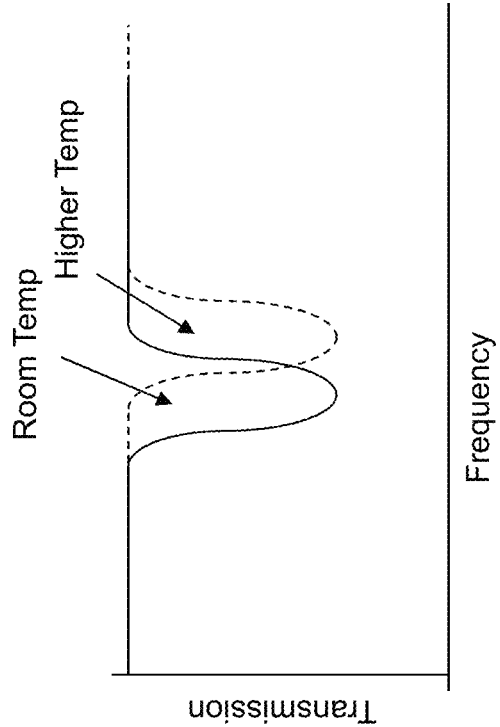
FIG. 5 depicts the operation of the photonic microring of FIG. 4.
Figure 4:
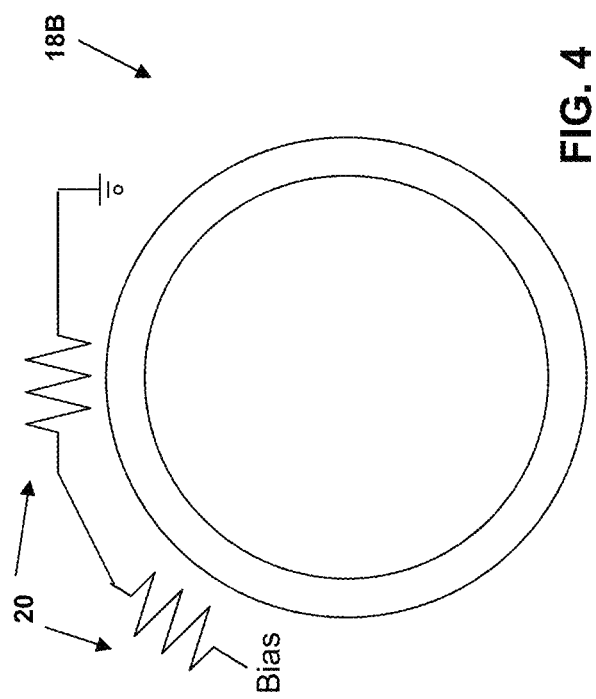
FIG. 4 depicts a photonic microring with a tunable resonance frequency.
Figure 6:
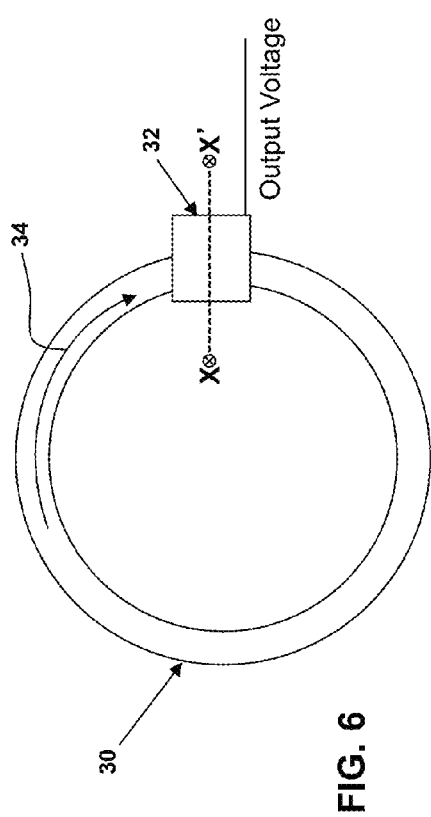
FIG. 6 depicts a photonic microring with a germanium (Ge) signal detector according to embodiments.
Figure 7:
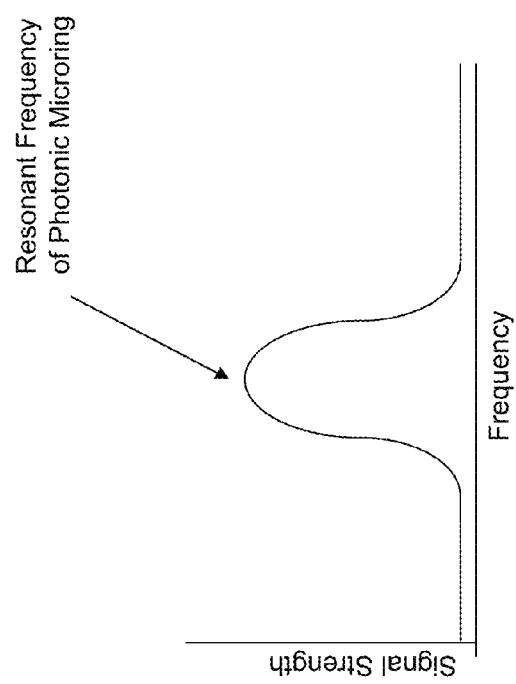
FIG. 7 depicts signal strength versus frequency in the photonic microring of FIG. 6 according to embodiments.

A photonic microring 30 including a germanium (Ge) signal detector 32 according to embodiments is depicted in FIG. 6. The Ge signal detector 32 may be positioned in close proximity to the photonic microring 30 in order to monitor the level of an optical signal 34 in the photonic microring 30. In an in-resonance state, a strong optical signal 34 is present in the photonic microring 30. In an off-resonance state, a weak optical signal 34 is present in the photonic microring 30. The Ge signal detector 32 may be disposed on top of, underneath, or next to the photonic microring 30. FIG. 7 depicts signal strength versus frequency in the photonic microring 30 of FIG. 6, as measured by the Ge signal detector 32.

Figure 8:
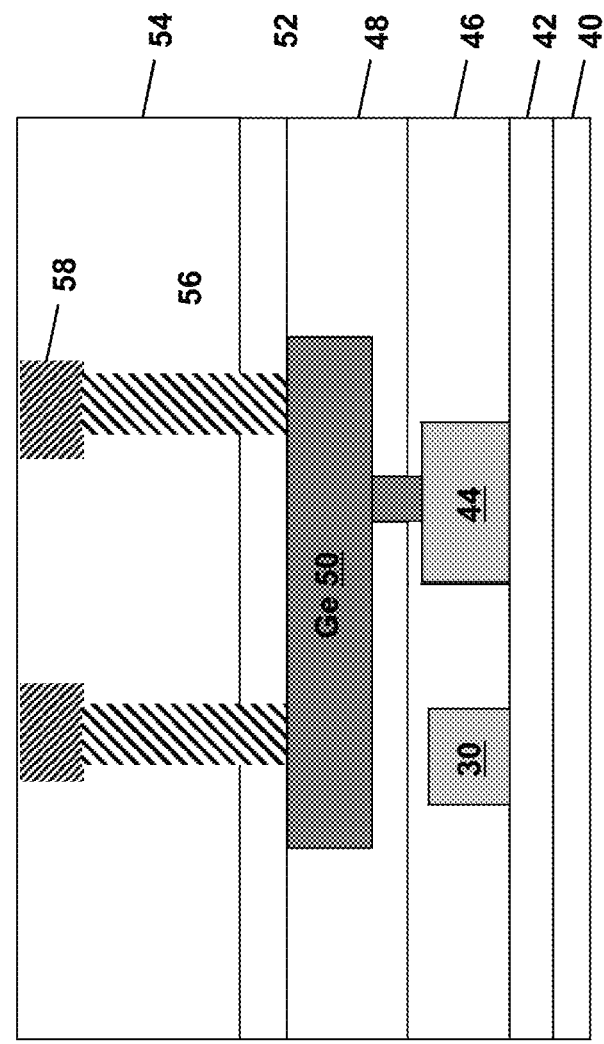
FIG. 8 depicts a cross-section of a Ge signal detector taken along line X-X' of FIG. 6 according to embodiments.

FIG. 8 depicts a cross-section of the Ge signal detector 32 taken along line X-X' of FIG. 6 according to embodiments. Known semiconductor processing techniques may used to form the Ge signal detector 32. An illustrative process for forming the Ge signal detector 32 is provided below. Other processes/materials may, of course, be used in the formation of the Ge signal detector 32; the below example is not meant to be limiting.

The silicon (Si) layer of an SOI semiconductor wafer including a substrate 40 and an insulating (e.g., oxide) layer 42 is selectively etched to form the photonic microring 30 and an Si seed layer 44 used for the epitaxial regrowth of Ge during a later processing step. After the deposition of an insulating (e.g., oxide) layer 46 and a barrier (e.g., silicon nitride (SiN)) layer 48 over the photonic microring 30 and the Si seed layer 44, the insulating layer 46 and the barrier layer 48 are selectively etched and an intrinsic Ge layer 50 is deposited. The Ge layer 50 contacts the Si seed layer 44. The Ge layer 50 is subsequently encapsulated by an additional barrier (e.g., SiN) layer 52. The structure is then annealed to melt the Ge layer 50. After annealing, the Ge layer 50 recrystallizes. A layer 54 of an insulator (e.g., oxide) is then deposited. The insulator layer 54 and barrier layer 52 are selectively etched to form contact openings to the Ge layer 50. A first metal (e.g., tungsten (W)) 56 and a second metal (e.g., copper (Cu)) 58 are deposited in the openings to form metal contacts to the Ge layer 50. In this example, the microring 30 can be considered as including an integral Ge signal detector 32.

Figure 9:
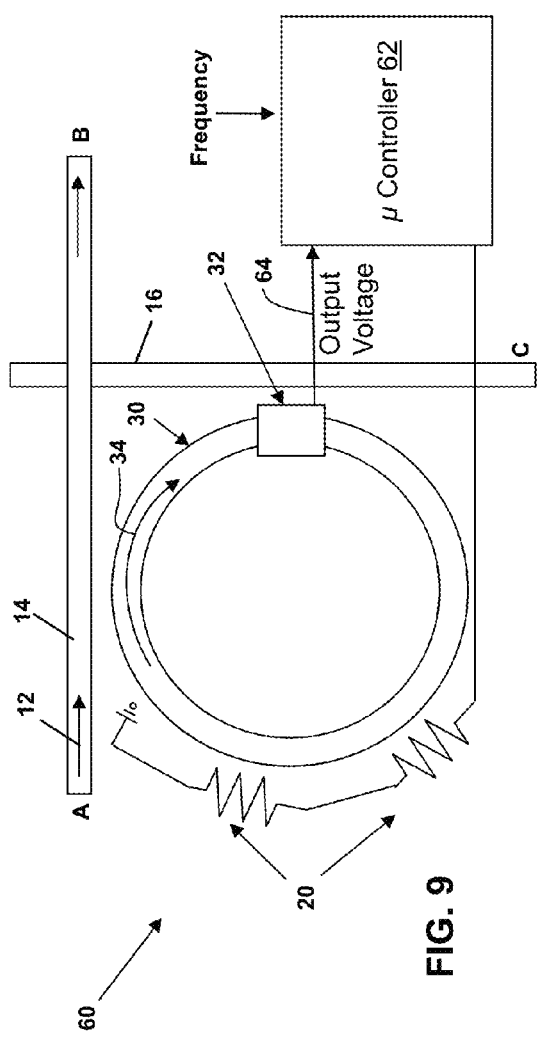
FIGS. 9 and 10 depict a waveguide switch including the photonic microring of FIG. 6 according to embodiments.
Figure 10:
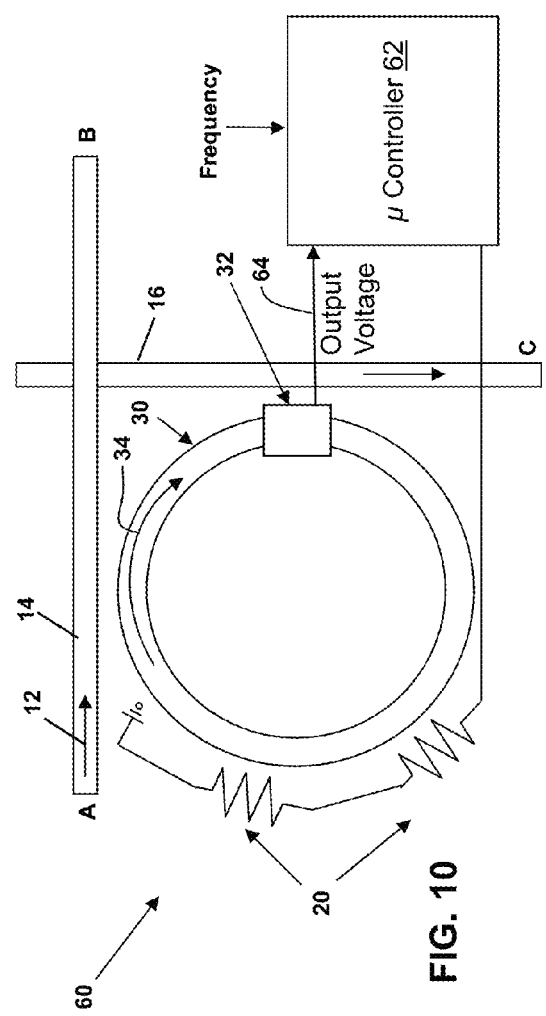

FIGS. 9 and 10 depict a waveguide switch 60 including the photonic microring 30 of FIG. 6 according to embodiments. FIG. 9 shows the waveguide switch 60 in an "off" state, in which an optical signal 12 travels via a first waveguide 14 from a point A to a point B, while FIG. 10 shows the waveguide switch 60 in an "on" state, in which the optical signal 12 is coupled through the photonic microring 30 into the second waveguide 16, traveling from point A to point C.

FIGS. 9 and 10 include a feedback circuit, comprising the Ge signal detector 32, a microcontroller 62, and at least one resistor 20. An output voltage signal 64 corresponding to the strength of the optical signal 34 in the photonic microring 30 is generated by the Ge signal detector 32 and received by the microcontroller 62. The frequency of the optical signal 12 is also provided to the microcontroller 62.

The microcontroller 62 is configured to monitor the strength of the optical signal 34 in the photonic microring 30. Based on the strength of the optical signal 34 in the photonic microring 30, the microcontroller 62 may adjust, as necessary, the temperature (and thus the resonant frequency) of the photonic microring 30 by selectively applying a voltage bias across the resistors 20. To this extent, the microcontroller 62 can selectively adjust the resonant frequency of the photonic microring 30 toward or away from the frequency of the optical signal 12 to control the coupling of the photonic microring 30 and the waveguides 14, 16 in the waveguide switch 60. In FIG. 9, for example, the microcontroller 62 has adjusted the resonant frequency of the photonic microring 30 away from the frequency of the optical signal 12 by applying a first voltage bias (e.g., ≥0 V) to the resistors 20. To this extent, the photonic microring 30 will not couple the optical signal 12 from the waveguide 14 to the waveguide 16; the waveguide switch 60 is in an "off" state. Analogously, in FIG. 10, the microcontroller 62 has adjusted the resonant frequency of the photonic microring 30 to be equal to the frequency of the optical signal 12 by applying a second, different voltage bias (e.g., ≥0 V) to the resistors 20. In this case, the photonic microring 30 couples the optical signal 12 from the waveguide 14 to the waveguide 16; the waveguide switch 60 is in an "on" state.

A photonic microring 70 including a germanium (Ge) signal detector 72 according to embodiments is depicted in FIGS. 11 and 12. In this embodiment, the photonic microring 70 includes a layered structure of n-type/p-type silicon. The frequency of the photonic microring 70 may be tuned by applying a voltage bias across the pn junction formed by the layered structure of n-type/p-type silicon.

The Ge signal detector 72 may be positioned in close proximity to the photonic microring 70 in order to monitor the level of an optical signal 74 in the photonic microring 70. In an in-resonance state, a strong optical signal 74 is present in the photonic microring 70. In an off-resonance state, a weak optical signal 74 is present in the photonic microring 70. The Ge signal detector 72 may be disposed on top of, underneath, or next to the photonic microring 70. The signal strength versus frequency in the photonic microring 70, as measured by the Ge signal detector 72, is similar to that depicted in FIG. 7 for the photonic microring 30. In this example, the microring 70 can be considered as including an integral Ge signal detector 72.

FIGS. 11 and 12 also depict a waveguide switch 80 including the photonic microring 70 according to embodiments. FIG. 11 shows the waveguide switch 80 in an "off" state, in which an optical signal 12 travels via a first waveguide 14 from a point A to a point B, while FIG. 12 shows the waveguide switch 80 in an "on" state, in which the optical signal 12 is coupled through the photonic microring 70 into the second waveguide 16, traveling from point A to point C.

The waveguide switch 80 includes a feedback circuit, comprising the Ge signal detector 72 and a microcontroller 82. An output voltage signal 84 corresponding to the strength of the optical signal 74 in the photonic microring 70 is generated by the Ge signal detector 72 and received by the microcontroller 82. The frequency of the optical signal 12 is also provided to the microcontroller 82.

The microcontroller 82 is configured to monitor the strength of the optical signal 74 in the photonic microring 70. Based on the strength of the optical signal 74 in the photonic microring 70, the microcontroller 82 may apply, as necessary, a voltage bias to the photonic microring 70 to tune the resonant frequency of the photonic microring 70. To this extent, the microcontroller 82 can selectively adjust the resonant frequency of the photonic microring 70 toward or away from the frequency of the optical signal 12 to control the coupling of the photonic microring 70 and the waveguides 14, 16 in the waveguide switch 80. In FIG. 11, for example, the microcontroller 82 has adjusted the resonant frequency of the photonic microring 70 away from the frequency of the optical signal 12 by applying a first voltage bias (e.g., ≥0 V) to the photonic microring 70. To this extent, the photonic microring 70 will not couple the optical signal 12 from the waveguide 14 to the waveguide 16; the waveguide switch 80 is in an "off" state. Analogously, in FIG. 12, the microcontroller 82 has adjusted the resonant frequency of the photonic microring 70 to be equal to the frequency of the optical signal 12 by applying a second, different voltage bias (e.g., ≥0 V) to the photonic microring 70. In this case, the photonic microring 70 couples the optical signal 12 from the waveguide 14 to the waveguide 16; the waveguide switch 80 is in an "on" state.

The terminology used herein is for the purpose of describing particular example embodiments only and is not intended to be limiting. As used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Spatially relative terms, such as "inner," "outer," "beneath", "below", "lower", "above", "upper" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. An optical structure, comprising:
   a semiconductor device including a photonic microring with an integral signal detector for detecting a level of an optical signal in the photonic microring, wherein the semiconductor device includes:
   a substrate;
   a first insulating layer formed atop the substrate;
   a photonic microring and a seed layer formed in the insulating layer;
   a barrier layer formed atop the photonic microring and the seed layer;
   a germanium signal detector formed in the barrier layer and extending over both the photonic microring and the seed layer, the signal detector contacting the seed layer;
   a second insulating layer formed atop the signal detector; and
   at least one electrical contact extending through the second insulating layer and contacting the signal detector;
   and
   a microcontroller, coupled to the signal detector, and receiving an output voltage signal corresponding to the level of the optical signal in the photonic microring and a frequency of the optical signal in the photonic microring, for adjusting a resonant frequency of the photonic microring based on the detected level of the optical signal in the photonic microring.

2. The optical structure according to claim 1, wherein the microcontroller applies a voltage bias to the photonic microring to adjust the resonant frequency of the photonic microring.

3. The optical structure according to claim 1, further comprising at least one component for heating the photonic microring to adjust the resonant frequency of the photonic microring.

4. The optical structure according to claim 3, wherein the at least one component comprises a resistor, and wherein the microcontroller applies a voltage bias to the resistor.

5. The optical structure according to claim 1, wherein the microcontroller adjusts the resonant frequency of the photonic microring such that is equal to a frequency of an optical signal in an adjacent structure to increase coupling between the photonic microring and the adjacent structure.

6. The optical structure according to claim 1, wherein the microcontroller adjusts the resonant frequency of the photonic microring such that is not equal to a frequency of an optical signal in an adjacent structure to decrease coupling between the photonic microring and the adjacent structure.

7. The optical structure according to claim 1, wherein the signal detector comprises a germanium (Ge) signal detector.

8. An optical switch, comprising:
   a first waveguide;
   a second waveguide;
   a semiconductor device including a photonic microring with an integral signal detector for detecting a level of an optical signal in the photonic microring, wherein the semiconductor device includes:
   a substrate;
   a first insulating layer formed atop the substrate;
   a photonic microring and a seed layer formed in the insulating layer;
   a barrier layer formed atop the photonic microring and the seed layer;
   a germanium signal detector formed in the barrier layer and extending over both the photonic microring and the seed layer, the signal detector contacting the seed layer;
   a second insulating layer formed atop the signal detector; and
   at least one electrical contact extending through the second insulating layer and contacting the signal detector;
   and
   a microcontroller, coupled to the signal detector, and receiving an output voltage signal corresponding to the level of the optical signal in the photonic microring and a frequency of the optical signal in the photonic microring, for adjusting a resonant frequency of the photonic microring based on the detected level of the optical signal in the photonic microring to selectively couple an optical signal from the first waveguide, through the photonic microring, into the second waveguide.

9. The optical switch according to claim 8, wherein the microcontroller applies a voltage bias to the photonic microring to adjust the resonant frequency of the photonic microring.

10. The optical switch according to claim 8, further comprising at least one component for heating the photonic microring to adjust the resonant frequency of the photonic microring.

11. The optical switch according to claim 10, wherein the at least one component comprises a resistor, and wherein the microcontroller applies a voltage bias to the resistor.

12. The optical switch according to claim 8, wherein the microcontroller adjusts the resonant frequency of the photonic microring to be equal to a frequency of the optical signal in the first waveguide to increase coupling between the photonic microring and the adjacent structure.

13. The optical switch according to claim 8, wherein the microcontroller adjusts the resonant frequency of the photonic microring away from a frequency of the optical signal in the first waveguide to decrease coupling between the photonic microring and the adjacent structure.

14. The optical switch according to claim 8, wherein the signal detector comprises a germanium (Ge) signal detector.

* * * * *